United States Patent [19]

Gall et al.

[11] 4,018,286

[45] Apr. 19, 1977

[54] CONTROLLED WELL PLUGGING WITH DILUTE POLYMER SOLUTIONS

[75] Inventors: James W. Gall; Everett L. Johnston, both of Bartlesville, Okla.

[73] Assignee: Phillips Petroleum Company, Bartlesville, Okla.

[22] Filed: Nov. 6, 1975

[21] Appl. No.: 629,359

[52] U.S. Cl. .................. 166/295; 166/294
[51] Int. Cl.² ........................... E21B 33/138
[58] Field of Search .......... 166/294, 295, 270, 300, 166/292

[56] References Cited

UNITED STATES PATENTS

| | | | |
|---|---|---|---|
| 3,223,162 | 12/1965 | Burge | 166/295 X |
| 3,306,870 | 2/1967 | Eilers et al. | 166/295 X |
| 3,421,584 | 1/1969 | Eilers et al. | 166/295 |
| 3,502,149 | 3/1970 | Pence, Jr. | 166/295 |
| 3,687,200 | 8/1972 | Routson | 166/295 X |
| 3,701,384 | 10/1972 | Routson et al. | 166/292 |
| 3,730,272 | 5/1973 | Richardson et al. | 166/294 |
| 3,762,476 | 10/1973 | Gall | 166/294 |
| 3,794,115 | 2/1974 | Skagerberg | 166/294 |
| 3,795,276 | 3/1974 | Eilers et al. | 166/294 X |

Primary Examiner—Stephen J. Novosad

[57] ABSTRACT

A method is provided for plugging an underground formation in which a composition of water, a polymer capable of gelling in the presence of a crosslinking agent, and a crosslinking agent capable of gelling the polymer are injected into an underground formation with maintenance of the pH in the underground formation within the range of about 3 to about 7. In an embodiment of the invention plugging of the underground formation can be removed by decreasing the pH in the formation below 3 or increasing the pH in the formation above 7.

4 Claims, No Drawings

CONTROLLED WELL PLUGGING WITH DILUTE POLYMER SOLUTIONS

BACKGROUND OF THE INVENTION

This invention relates to the treatment of underground formations to provide stoppages or plugs within the formation. In one of its aspects this invention relates to the creation of plugs in an underground formation under controlled conditions of pH. In another of its aspects this invention relates to the temporary plugging of an underground formation and the removal of gelled stoppages by controlling the pH of liquid in contact with the stoppages.

The advantages of using gel forming compositions for controlling the permeability of underground formations during waterflooding and chemical flooding operations is well known in the art. These plugging techniques are also used during well workovers, in fracture treatments, and to correct the injection profile of a well by sealing high permeability streaks so that flooding fluids will enter the formation in a more desirable front. In some of these operations it is desirable to temporarily plug a portion of an underground formation to direct treating fluids into certain zones of the formation and then remove the stoppages from the formation after the particular treatment is completed.

It is an object of this invention to provide a method which can be used either for permanent or temporary plugging of underground formations. It is also an object of this invention to provide a method for treating an underground formation in which the plugging can be controlled by control of the pH of fluids in contact with the plugging agent.

Other aspects, objects and the various advantages of this invention will become apparent upon reading this specification and the appended claims.

STATEMENT OF THE INVENTION

In accordance with this invention, a method for creating a plug in an underground formation penetrated by at least one well bore is provided in which a composition comprising water, a polymer capable of gelling in the presence of a crosslinking agent, and a crosslinking agent capable of gelling the polymer are admixed and injected into an underground formation while maintaining the pH of the fluids contacting the composition within the range of about 3 to about 7.

In one embodiment of this invention a temporary plug can be created in an underground formation by injecting into the formation an admixture of water, polymer capable of gelling in the presence of a crosslinking agent, and a crosslinking agent capable of gelling the polymer with the admixture maintained at a pH within the range of about 3 to about 7 for the period of time desired for temporary plugging of the formation and thereafter injecting liquids capable of decreasing the pH below 3, preferably below 2, or increasing the pH above 7, preferably above 10, in the contact with the composition in the underground formation.

Polymers suitable for use in this invention, i.e., those capable of gelling in the presence of the crosslinking agents of this invention, can be selected from the group consisting of polyacrylamides, partially hydrolyzed polyacrylamides, polyacrylonitrile, polyacrylic acid, polyvinylpyrrolidone, polysaccharides, carboxymethylcellulose, other substituted celluloses, polyvinyl alcohol, polystyrene sulfonates, copolymers of acrylamide and acrylic acid of 2-acrylamido-2-methyl-1-propane sulfonic acid, and the like. These polymers can be utilized in solutions of fresh water or brines. Other polymers that are suitable for the method of the invention are: partially hydrolyzed polyacrylonitrile, water soluble cellulose ethers, lignosulfonates, partially hydrolyzed copolymers of acrylamide and acrylic acid or other vinylic or polyolefinic monomers, copolymers of acrylonitrile and acrylic acid or other vinylic or polyolefinic monomers, partially hydrolyzed copolymers of acrylonitrile and acrylic acid or other vinylic or polyolefinic monomers; copolymers of acrylic acid and other vinyl or polyolefinic monomers; partially hydrolyzed copolymers of acrylic acid and other vinylic or polyolefinic monomers; methylolated or sulfomethylolated forms of the above polymers.

The concentration of the water-soluble polymer in the aqueous system will range from about 50 to about 10,000 ppm, more usually from about 200 to about 2000 ppm. Any suitable procedure for preparing the crosslinked polymer solution can be used. For example, the polymer can be dispersed in a given amount of water and the desired amount of crosslinking agent then added. The solution can then be injected with or without delay.

The crosslinking agents that are capable of gelling polymers in the process of this invention are complexing ionic solutions having from 25 ppm to about 10,000 ppm of a multivalent metal cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, complexed with from about 25 to about 10,000 ppm of retarding anion selected from the group consisting of acetate, nitrilotriacetate, tartrate, citrate, tripolyphosphate, metaphosphate, gluconate, and phosphate.

The crosslinking agents are mixed in solution with the polymers and in actual practice will be gelled at the surface to form dilute gels which can be as viscous as water and can be handled without encountering pumping problems in getting the gels into the underground formation. Within the ranges cited for both polymer and crosslinking agents the ratio of metal ion to polymer affects the effectiveness of the composition as a plugging agent.

The amount of crosslinking agent used will, of course, depend largely upon the amount of polymer in solution. Lesser amounts of polymer will require lesser amounts of crosslinking agent, and vice versa. Further, it has been found that, for a given concentration of polymer, increasing the amount of crosslinking agent generally substantially increases the formation plugging effectiveness.

The pH of the liquid in contact with the treating compositions used in this invention is critical to the successful plugging of the underground formation. The dilute gels produced in the process of this invention are sufficiently strong to produce the desired plugging action only within a pH range of about 3 to about 7.

The embodiment of this invention in which the plugging of an underground formation is destroyed is based on the reduction of strength of the gels as the pH is increased above 7 or decreased below 3. Removal of a plug created by the process of this invention is easily carried out in situ by contacting plugs formed by the gels with a liquid that will reduce the pH below 3 or raise the pH above 7. Acid solutions for reducing the pH and basic solutions for raising the pH are well known in the art and include commonly used acids such as hydrochloric, sulfuric, nitric, among others and commonly used bases such as sodium hydroxide, potassium hydroxide, and the like. Those skilled in the art will recognize that basic solutions are not generally used in petroleum field operations so that the preferable means for destroying gelled plugs will be to acidify the liquid surrounding the gels to a pH below 3.

The following Examples are set forth as illustrative of the process of this invention and are not meant to be restrictive.

EXAMPLE I

In cases A and B the fluids of indicated composition were passed through the 200 md Berea sandstone cores which were initially saturated with brine until the flow rate decreased to zero. At this point the core was plugged and the volume of effluent was measured.

TABLE I

| Case A | | Case B | |
|---|---|---|---|
| Fluid: 200 ppm Dow Pusher 700* | | Fluid: 50 ppm Dow Pusher 700* | |
| 480 ppm | $AlCl_3 \cdot 6H_2O$ | 1920 ppm | $AlCl_3 \cdot 6H_2O$ |
| 210 ppm | Citric Acid | 840 ppm | Citric Acid |
| pH = 7 | | pH = 7 | |
| 7 cc plugged a 1-inch diameter 200 md Berea Core | | 15 cc plugged a 1-inch diameter 200 md Berea Core | |

*A commercial acrylamide polymer having a molecular weight of about 5.5 million and a degree of hydrolysis of about 23.5%.

The above Case A and Case B illustrate the advantage possible in this process of using low concentration of costly polymer along with increase concentration of complexing agent to produce equivalent results employing a sample core.

EXAMPLE II

The data in Table II were developed from the behavior of solutions containing 250 ppm Dow Pusher 700 and the designated amounts of Al (III). These solutions were aged for various times at either 77° or 140° F and then passed through artificially fractured Berea cores. When no further change in the permeability occurred, the volume throughput was recorded and the factor by which the permeability had been decreased was calculated.

TABLE II

Plugging Achieved by Fluids Containing Low (250 ppm) Concentrations of Dow Pusher 700 and Various Amounts of Aluminum Citrate

| Aluminum Citrate (ppm Al) | Aging Time (Hrs.) | Temp. (° F) | Volume of Through Put* (BB1/100 ft²) | Factor by Which Permeability is Decreased |
|---|---|---|---|---|
| 0 | 48 | 77 | 2.3 | 1 |
| 2.7 | 24 | 77 | 2.3 | 6.7 |
| 7.9 | 24 | 77 | 2.2 | 54 |
| 12.9 | 24 | 77 | 2.3 | 99 |
| 17.7 | 24 | 77 | 0.23 | 482 |
| 2.7 | 20 | 140 | 2.3 | 35 |
| 7.9 | 20 | 140 | 0.64 | 359 |
| 12.9 | 20 | 140 | 0.77 | 1050 |
| 17.7 | 20 | 140 | 0.20 | 2000 |
| 2.7 | 72 | 140 | 2.3 | 43 |
| 7.9 | 72 | 140 | 0.70 | 707 |
| 12.9 | 72 | 140 | 0.16 | 1310 |
| 17.7 | 72 | 140 | 0.41 | 2130 |

*Barrels of fluid injected per 100 square feet of sand face.

The data in Table II show first that adding the small amounts of aluminum citrate greatly enhances the amount of plugging obtained over that by polymer alone (see comparison run with no aluminum citrate). The data further show that the amount of plugging or fluid loss can be varied and that increasing the amount of aluminum citrate increases the amount of plugging (the amount of Al in the three test runs from 2.7 to 17.7 ppm). The amount of plugging can be increased by heating the fluid but after a certain amount of time the amount of plugging becomes constant (heating was at 77° and 140° F).

EXAMPLE III

Solutions containing 250 ppm Dow Pusher 700 and the designated amount of Al (III) were prepared and the pH was adjusted to the values listed in Table III. Approximately 30 cc of the fluids were passed through five 100 mesh stainless steel screens and the efflux time measured as shown in Table III. Longer times indicate greater plugging by the fluid.

TABLE III

Plugging a Pack of five 100 mesh screens by fluids containing low (250 ppm) concentration of Dow Pusher 700 and aluminum citrate.

| Aluminum Citrate (ppm Al) | pH | Efflux Time for 30 cc of Fluid to flow through five 100 mesh screens (Sec.) |
|---|---|---|
| 0 | 6 | 71.4 |
| 2.7 | 6 | 72.7 |
| 5.3 | 6 | 114 |
| 7.9 | 6 | 340 |
| 9.5 | 6 | 520 |
| 10.4 | 6 | 225 |
| 12.9 | 6 | Plugged |
| 24.5 | 6 | Plugged |
| 24.5 | 2.1 | 25.5 |
| 24.5 | 2.4 | 33 |
| 24.5 | 3.0 | Plugged |
| 24.5 | 3.9 | Plugged |
| 24.5 | 5.8 | Plugged |
| 24.5 | 6.6 | Plugged |
| 24.5 | 6.7 | 8000 |
| 24.5 | 6.8 | 6000 |
| 24.5 | 7.2 | 39 |
| 24.5 | 7.9 | 27 |

The data listed in the top half of Table III show again that the amount of plugging increases at constant pH as the amount of aluminum citrate increases. The second set of data in the lower half of Table III show how the amount of plugging varies as a function of pH at constant ppm Al. The optimum range for pH is between about 3 and about 7. These data demonstrate the utility of these fluids as a temporary plugging material. When the plug is no longer desired it can be removed by a simple acid or base treatment to lower or raise the pH outside the desired range.

EXAMPLE IV (Calculated)

It is advantageous to use the inventive process in a well which needs remedial work requiring fluids which would be detrimental to the permeability of the formation. Prior to the well workover five barrels of a solution containing 250 ppm Dow Pusher 700 and 18 ppm Al (as aluminum citrate) at pH 5 are injected into the well. This solution effectively seals the formation to the workover fluids thus preserving the permeability. After the workover is completed, the fluids are removed from the wellbore and ten barrels of 15% HCl are injected. After a period of time, the face plug is destroyed and the formation permeability is restored and operation is resumed.

We claim:
1. A method for creating a temporary plug in an underground formation penetrated by at least one wellbore, said method comprising:
   1. creating a plug by injecting into said formation a composition comprising:
      a. water,
      b. a polymer capable of gelling in the presence of a crosslinking agent, said polymer selected from the group consisting of polyacrylamides, partially hydrolyzed polyacrylamides, polyacrylonitrile, polyacrylic acid, polyvinylpyrrolidone, polysaccharides, carboxymethylcellulose, other substituted celluloses, polyvinyl alcohol, polystyrene sulfonates, copolymers of acrylamide and acrylic acid or 2-acrylamido-2-methyl-1-propane sulfonic acid.
      c. a complexing agent comprised of multivalent cations selected from the group consisting of $Fe^{2+}$, $Fe^{3+}$, $Al^{3+}$, $Ti^{4+}$, $Sn^{4+}$, $Ca^{2+}$, $Mg^{2+}$, and $Cr^{3+}$, and
      d. retarding ions selected from the group consisting of acetate, nitrilotriacetate, tartrate, citrate, tripolyphosphate, metaphosphate, gluconate, and ortho-phosphate; and
   2. maintaining a pH of fluids contacting the composition in the formation within the range of about 3 to about 7 for the time desired for temporarily plugging the formation; and
   3. thereafter injecting liquid capable of decreasing the pH below 3 or increasing the pH above 7 into contact with said composition.

2. The method of claim 1 wherein the polymer is present in aqueous solution in an amount from about 50 up to about 10,000 ppm.

3. A method according to claim 2 wherein the polymer is comprised of partially hydrolyzed polyacrylamide, the multivalent cation is $Al^{3+}$ and the retarding anion is citrate.

4. The method of claim 2 wherein the multivalent cation is present in aqueous solution in an amount of from about 25 to about 10,000 ppm and the retarding ion is present in an aqueous solution in an amount from about 25 to about 10,000 ppm.

* * * * *